US012624155B2

(12) United States Patent
Du

(10) Patent No.: US 12,624,155 B2

(45) Date of Patent: May 12, 2026

(54) PREPARATION METHOD OF LOW-CHLORINE EPOXY RESIN AND USE THEREOF

(71) Applicant: Zillion New Material Technology (Xi'an) Co., Ltd., Xi'an City (CN)

(72) Inventor: Biao Du, Xi'an City (CN)

(73) Assignee: Zillion New Material Technology (Xi'an) Co., Ltd., Xi'an City (CN)

(*) Notice: Subject to any disclaimer, the term of this patent is extended or adjusted under 35 U.S.C. 154(b) by 510 days.

(21) Appl. No.: 18/172,961

(22) Filed: Feb. 22, 2023

(65) Prior Publication Data

US 2024/0026066 A1 Jan. 25, 2024

(30) Foreign Application Priority Data

Jul. 20, 2022 (CN) ......................... 202210859348.0

(51) Int. Cl.

| | |
|---|---|
| ***C08G 59/14*** | (2006.01) |
| ***C08G 59/02*** | (2006.01) |
| ***C08G 59/04*** | (2006.01) |
| ***C08G 59/06*** | (2006.01) |
| ***C08G 59/24*** | (2006.01) |

(52) U.S. Cl.

CPC ......... *C08G 59/022* (2013.01); *C08G 59/245* (2013.01); *C08G 2150/00* (2013.01); *C08G 2170/00* (2013.01)

(58) Field of Classification Search

None

See application file for complete search history.

(56) References Cited

U.S. PATENT DOCUMENTS

| | | | |
|---|---|---|---|
| 4,535,150 A | 8/1985 | Hunter | |
| 2009/0233225 A1 * | 9/2009 | Johnson | C08L 63/00 430/280.1 |

FOREIGN PATENT DOCUMENTS

| | | | | |
|---|---|---|---|---|
| CN | 108192075 A | | 6/2018 | |
| CN | 108821791 A | * | 11/2018 | C04B 40/0007 |
| CN | 114989396 A | * | 9/2022 | C08G 83/008 |
| DE | 102006042095 A1 | * | 3/2008 | H01L 23/293 |
| JP | S58122915 A | | 7/1983 | |
| JP | S5933318 A | | 2/1984 | |
| JP | S62119222 A | | 5/1987 | |
| JP | S62235314 A | | 10/1987 | |
| JP | H01108219 A | | 4/1989 | |
| JP | H1036484 A | | 2/1998 | |
| JP | 2014065835 A | | 4/2014 | |

OTHER PUBLICATIONS

Machine translation of CN-108821791-A (no date).*
Machine translation of CN-114989396-A (no date).*
Machine translation of DE-102006042095-A1 (no date).*

* cited by examiner

*Primary Examiner* — Michael J Feely

(74) *Attorney, Agent, or Firm* — Harness, Dickey & Pierce, P.L.C.

(57) ABSTRACT

The present disclosure relates to the technical field of the epoxy resin, specifically, relates to a preparation method a low-chlorine epoxy resin and use thereof, which can solve the problem of a high total chlorine content in the epoxy resin to a certain extent. The preparation method of a low-chloride epoxy resin comprises: loading a metal oxide as a stationary phase on a grid inside a reaction kettle; the reaction kettle being externally connected to an alternating-current power supply, and under a first pre-set condition, diluted epoxy resin containing a chlorine impurity, as a mobile phase, flowing through the grid loaded with the metal oxide; the epoxy resin containing a chlorine impurity contacting and reacting with the metal oxide to obtain a purified epoxy resin.

7 Claims, 1 Drawing Sheet

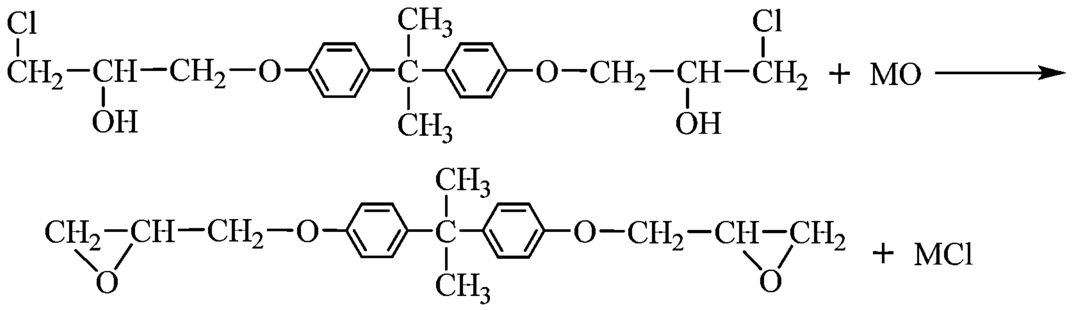

$$\underset{\substack{\text{CH}_2-\text{CH}-\text{CH}_2}}{\overset{\text{Cl}}{|}}\text{OH} - \text{O} - \text{C}_6\text{H}_4 - \underset{\substack{\text{CH}_3}}{\overset{\text{CH}_3}{\text{C}}} - \text{C}_6\text{H}_4 - \text{O} - \text{CH}_2 - \underset{\text{OH}}{\text{CH}} - \overset{\text{Cl}}{\text{CH}_2} + \text{MO} \longrightarrow$$

$$\text{CH}_2-\text{CH}-\text{CH}_2 - \text{O} - \text{C}_6\text{H}_4 - \underset{\substack{\text{CH}_3}}{\overset{\text{CH}_3}{\text{C}}} - \text{C}_6\text{H}_4 - \text{O} - \text{CH}_2 - \text{CH} - \text{CH}_2 + \text{MCl}$$

PREPARATION METHOD OF LOW-CHLORINE EPOXY RESIN AND USE THEREOF

CROSS-REFERENCE TO RELATED APPLICATION

This application claims priority to Chinese Application No. 202210859348.0, filed Jul. 20, 2022 with the China National Intellectual Property Administration, the entirety of which is incorporated herein by reference.

FIELD OF THE PRESENT DISCLOSURE

The present disclosure relates to the technical field of epoxy resins, and in particular to a preparation method of a low-chlorine epoxy resin and use thereof.

BACKGROUND OF THE PRESENT DISCLOSURE

Epoxy resin has good mechanical properties, high temperature resistance, good insulation performance, and is widely used in coatings, adhesives, flooring adhesives, electronic products and other fields.

However, chlorine residue in epoxy resin has a lot of adverse effects on the application performance of products, which limits the application of epoxy resin in the fields of photoresists, electronic packaging, chip adhesive and other electronic products.

In the field of epoxy resin applications of photoresists, the total chlorine content in the epoxy resin is required to be less than 800 ppm. At present, the most common method for removing chlorine in epoxy resin in industry is molecular distillation method, but it requires huge energy consumption and high production cost by this method for achieving the total chlorine content below 800 ppm, which is not advantageous for industrial production.

SUMMARY OF THE PRESENT DISCLOSURE

In order to solve the problem of high total chlorine content in the epoxy resin, the present disclosure provides a preparation method of a low-chlorine epoxy resin and the use thereof.

The embodiments of the present disclosure are carried out as follows.

Embodiments of the present disclosure provide a preparation method of a low-chlorine epoxy resin, comprising:

- loading a metal oxide as a stationary phase on a grid inside a reaction kettle;
- the reaction kettle being externally connected to an alternating-current power supply, and under a first pre-set condition, a diluted epoxy resin containing a chlorine impurity, as a mobile phase, flowing through the grid loaded with the metal oxide; and
- the epoxy resin containing a chlorine impurity contacting and reacting with the metal oxide to form a purified epoxy resin.

In some embodiments, the metal oxide is CaO, FeO, MgO, or CuO.

In some embodiments, a molar ratio of the metal oxide to the epoxy resin containing a chlorine impurity is (0.5~1.5): 1.

In some embodiments, the epoxy resin is diluted with xylene, acetone, methyl ethyl ketone, cyclohexanone, benzene, n-butanol or styrene as a solvent to obtain the diluted epoxy resin containing a chlorine impurity.

In some embodiments, the alternating-current power source has a frequency of 45 Hz~75 Hz and a voltage of 220 V~380 V.

In some embodiments, the first pre-set condition comprises: a reaction time of being 3 h~5 h for reacting the epoxy resin containing a chlorine impurity with the metal oxide, and during the reaction, the reaction temperature of 50° C.~90° C. in the reaction kettle.

In some embodiments, a reaction principle of reacting the epoxy resin containing a chlorine impurity with the metal oxide to form a purified epoxy resin is:

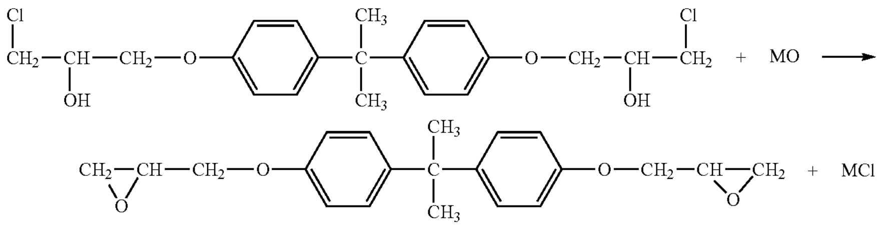

wherein MO is the metal oxide.

Yet another embodiment of the present disclosure provides use of a low-chlorine epoxy resin, comprising applying a purified epoxy resin prepared with the preparation method of a low-chlorine epoxy resin described above to a photoresist.

Advantageous effects of the present disclosure: the epoxy resin containing a chlorine impurity, which is diluted by a solvent, flows through the metal oxide as a mobile phase; due to an external alternating electric field of the reaction device, the chlorine impurities and the metal oxide in the epoxy resin are easily polarized under the action of the alternating electric field, so that the chlorine impurities and the metal oxide in the epoxy resin have a high reaction activity, and then the epoxy resin containing a chlorine impurity and the metal oxide are reacted to obtain a purified epoxy resin and a by-product of metal chloride; the by-product of metal chloride produced thereby has the property of being insoluble in the organic solvent, and thus the purified epoxy resin also does not contain the metal chloride.

In the present disclosure, the removal mechanism of the chlorine impurities in the epoxy resin is clear, the total chlorine content of the product is controllable, the reaction conditions are easy to control, and the reaction process is simple.

BRIEF DESCRIPTION OF THE DRAWINGS

In order to explain the technical solutions in the embodiments of the present disclosure or the prior art more clearly, the following briefly illustrates the embodiments or the drawings required to be used in the description of the prior art. Obviously, the drawings in the description below are some embodiments of the present disclosure, and it would have been obvious for a person of ordinary skill in the art to obtain other drawings according to these drawings without involving any creative efforts.

FIG. 1 is a schematic reaction diagram of the reaction of an epoxy resin containing a chlorine impurity with a metal oxide provided in the examples of the present disclosure.

DESCRIPTION OF THE EMBODIMENTS

For the purposes, embodiments, and advantages of the present disclosure to be more clear, reference will now be made to the drawings of the exemplary embodiments of the present disclosure, and the exemplary embodiments of the present disclosure will be described clearly and completely. Obviously, the illustrated exemplary embodiments are only part of, not all of, the embodiments of the present disclosure.

It should be noted that the brief description of terms in this application is merely for convenience in understanding the embodiments described below and is not intended to limit the embodiments of the present disclosure. Unless otherwise indicated, these terms should be understood in accordance with their general and conventional meaning.

The technical solutions provided in the present disclosure are explained in detail below with reference to specific embodiments.

The method for providing a purified epoxy resin without chlorine impurities by the reaction of chlorine in the epoxy resin with a metal oxide has a clear principle and can theoretically accomplish the purpose of removing chlorine impurities in the epoxy resin. However, in practice, it is difficult to react the metal oxide with chlorine impurities in epoxy resin under solid state conditions, which becomes the most restrictive factor limiting the application of this method.

The embodiments of the present disclosure make use of the feature that chlorine and a metal oxide are easily polarized under the action of an alternating electric field, so that chlorine and the metal oxide have a high reactivity, and the epoxy resin containing a chlorine impurity thus reacts with the metal oxide, so as to remove chlorine impurities in the epoxy resin to obtain a purified epoxy resin.

The preparation of the low-chlorine epoxy resin of the present disclosure is carried out in a reaction kettle. A multi-layer grid is placed in the reaction kettle and the metal oxide, as a fixed state, is loaded on the grid in a planar manner.

The reaction kettle is externally connected to an alternating-current power source, and under a first pre-set condition, the diluted epoxy resin containing a chlorine impurity, as a mobile phase, flows through the grid loaded with the metal oxide.

The epoxy resin containing a chlorine impurity contacts and reacts with the metal oxide to obtain a purified epoxy resin.

In the embodiments of the present disclosure, the epoxy resin containing a chlorine impurity after diluted by a solvent flows through the metal oxide as a mobile phase, and since the reaction device is externally connected with an alternating-current electric field, the chlorine impurities in the epoxy resin and the metal oxide are easily polarized under the action of the alternating-current electric field, so that the chlorine impurities and the metal oxide in the epoxy resin have a high reaction activity, and then the chlorine impurities in the epoxy resin and the metal oxide react to provide the epoxy resin with removal of the chlorine impurities (namely, the purified epoxy resin) and the by-product of metal chloride. As shown in FIG. 1, a reaction schematic diagram of the reaction between the epoxy resin containing a chlorine impurity and the metal oxide, the MO is a metal oxide.

The metal chloride produced as a by-product of the reaction has a property of being insoluble in an organic solvent, so that the by-product does not affect the purified of the epoxy resin.

It should be noted that epoxy resins containing a chlorine impurity include, but are not limited to, the following:

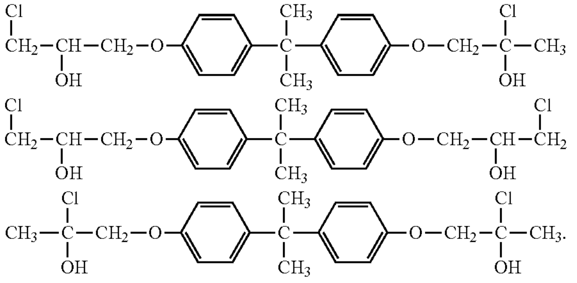

In some embodiments, the metal oxide is CaO, FeO, MgO, or CuO.

In some embodiments, a molar ratio of the metal oxide to the epoxy resin containing a chlorine impurity is (0.5~1.5):1.

In some embodiments, the epoxy resin containing a chlorine impurity is diluted with xylene, acetone, methyl ethyl ketone, cyclohexanone, benzene, n-butanol, or styrene as an organic solvent to provide the diluted epoxy resin containing a chlorine impurity.

In some embodiments, the alternating-current power source has a frequency of 45 Hz~75 Hz and a voltage of 220 V~380 V.

In some embodiments, the first pre-set condition comprises: a reaction time of the epoxy resin containing a chlorine impurity with the metal oxide is 3 h~5 h, and a temperature in the reaction kettle during the reaction is 50° C.~90° C.

It should be noted that the examples of the present disclosure provide a preparation method of a low-chlorine epoxy resin, which is performed with the aid of an alternating electric field, and the reaction is divided into two parts. The first step of the reaction is a displacement reaction between an epoxy resin containing a chlorine impurity and a metal oxide under heating conditions, wherein the chlorine in the epoxy resin is replaced by a hydroxyl group. The second reaction step is the dehydration of two adjacent hydroxyl groups in the epoxy resin to form a ring with the aid of an alternating electric field to provide a purified epoxy resin free of chlorine impurities. This method can easily and efficiently remove chlorine impurities in epoxy resin.

Embodiment 1

0.5 mol of CaO was loaded as a stationary phase on a grid inside the reaction kettle, a fixed bed in the reaction kettle was externally connected to an alternating-current power supply with a frequency of 52 Hz and a voltage of 220 V, and the reactor temperature was set to 50° C. 1 mol of epoxy resin containing a chlorine impurity was slowly introduced into the reaction kettle. The reaction of CaO with epoxy resin containing a chlorine impurity was carried out for 3 h with the aid of alternating current to obtain the purified epoxy resin.

Embodiment 2

0.8 mol of FeO was loaded as a stationary phase on a grid inside the reaction kettle, which was externally connected to an alternating-current power supply with a frequency of 60 Hz and a voltage of 250 V, and the reactor temperature was set to 60° C. 1 mol of epoxy resin containing a chlorine impurity was slowly introduced into the reaction kettle. The reaction of FeO with epoxy resin containing a chlorine impurity was carried out for 4 h with the aid of an alternating current to obtain the purified epoxy resin.

Embodiment 3

1 mol of MgO was loaded as the stationary phase on a grid inside the reaction kettle, which was externally connected to an alternating-current power supply with a frequency of 70 Hz and a voltage of 380 V, and the reactor temperature was set as 70° C. 1 mol of epoxy resin containing a chlorine impurity was slowly introduced into the reaction kettle. The reaction of MgO with epoxy resin containing a chlorine impurity was carried out for 5 h with the aid of an alternating current to remove the chlorine impurities to obtain the purified epoxy resin.

Embodiment 4

1.2 mol of CuO was loaded as the stationary phase on a grid inside the reaction kettle, which was externally connected to an alternating-current power supply with a frequency of 45 Hz and a voltage of 220 V, and the reactor temperature was set to 80° C. 1 mol of epoxy resin containing a chlorine impurity was slowly introduced into the reaction kettle. The reaction of CuO with epoxy resin containing a chlorine impurity was carried out for 3 h with the aid of an alternating current to remove the chlorine impurities to obtain the purified epoxy resin.

Embodiment 5

1.5 mol of CaO was loaded as the stationary phase on a grid inside the reaction kettle, which was externally connected to an alternating-current power supply with a frequency of 50 Hz and a voltage of 300 V, and the reactor temperature was set to 90° C. 1 mol of epoxy resin containing a chlorine impurity was slowly introduced into the reaction kettle. The reaction of the metal oxide with the epoxy resin containing a chlorine impurity was carried out for 4 h with the aid of an alternating current to remove the chlorine impurities to obtain the purified epoxy resin.

The initial chlorine content and the final chlorine content of the epoxy resins containing a chlorine impurity in Embodiments 1 to 5 were measured by the Moire method, and the results are shown in Table 1.

TABLE 1

Test results of chlorine content of epoxy resin before and after reaction

| Items | Embodiment 1 | Embodiment 2 | Embodiment 3 | Embodiment 4 | Embodiment 5 |
|---|---|---|---|---|---|
| M (initial chlorine content)/ppm | 802 | 813 | 845 | 862 | 852 |
| M (initial chlorine content)/ppm | 237 | 214 | 209 | 218 | 221 |

It can be seen from Table 1 that the preparation method of the low-chlorine epoxy resin provided in the embodiments of the present disclosure can effectively remove chlorine impurities in the epoxy resin, and when the molar ratio of the metal oxide to the epoxy resin containing a chlorine impurity is 1:1, the reaction temperature is 70° C., and the reaction time is 4 h, the removal effect of the chlorine impurities in the epoxy resin is the best.

In some embodiments, this embodiment provides a use of a low-chloride epoxy resin, comprising applying a purified epoxy resin prepared by the preparation method of a low-chloride epoxy resin described above to a photoresist.

After diluted by a solvent, the epoxy resin containing a chlorine impurity, as a mobile phase, flows through the metal oxide; due to an external alternating electric field of the reaction device, the chlorine impurities in the epoxy resin and the metal oxide are easily polarized under the action of the alternating electric field, so that the chlorine impurities in the epoxy resin and the metal oxide have a high reaction activity, and then the epoxy resin containing a chlorine impurity and the metal oxide react to obtain a purified epoxy resin and a by-product of metal chloride. The by-product of metal chloride produced thereby has the property of being insoluble in the organic solvent, and the purified epoxy resin also does not contain the metal chloride accordingly.

In the present disclosure, the removal mechanism of the chlorine impurities in the epoxy resin is clear, the total chlorine content of the product is controllable, the reaction conditions are easy to control, and the reaction process is simple.

The foregoing is a further detailed description of the present disclosure and is not to be construed that the detailed embodiments of the present disclosure are limited as it is now. For a person skilled in the art to which the present disclosure relates, several simple speculations or replacements can be made without departing from the inventive concept, all of which should be regarded as being within the scope of the disclosure as defined by the claims presented.

What is claimed is:

1. A preparation method of a low-chlorine epoxy resin, comprising:

loading a metal oxide on a grid inside a reaction kettle, the metal oxide representing a stationary phase;

supplying power to the reaction kettle from an externally connected alternating-current power supply, providing an epoxy resin that has been diluted with a solvent, the epoxy resin containing a chlorine impurity, and flowing the diluted epoxy resin, as a mobile phase, through the stationary phase under a first pre-set condition;

wherein the epoxy resin containing a chlorine impurity contacts and reacts with the metal oxide to provide a purified epoxy resin.

2. The preparation method of a low-chlorine epoxy resin according to claim 1, wherein the metal oxide is CaO, FeO, MgO, or CuO.

3. The preparation method of a low-chlorine epoxy resin according to claim 2, wherein a molar ratio of the metal oxide to the epoxy resin containing a chlorine impurity is (0.5~1.5): 1.

4. The preparation method of a low-chlorine epoxy resin according to claim 1, wherein the solvent is xylene, acetone, methyl ethyl ketone, cyclohexanone, benzene, n-butanol or styrene.

5. The preparation method of a low-chlorine epoxy resin according to claim 1, wherein the alternating-current power source has a frequency of 45 Hz~75 Hz and a voltage of 220 V~380 V.

6. The preparation method of a low-chlorine epoxy resin according to claim 5, wherein the first pre-set condition comprises: a reaction time of 3 h~5 h for reacting the epoxy resin containing a chlorine impurity with the metal oxide, and a reaction temperature of 50° C.~90° C. in the reaction kettle during the reaction.

7. The preparation method of a low-chlorine epoxy resin according to claim 1, wherein a reaction principle of the reaction is:

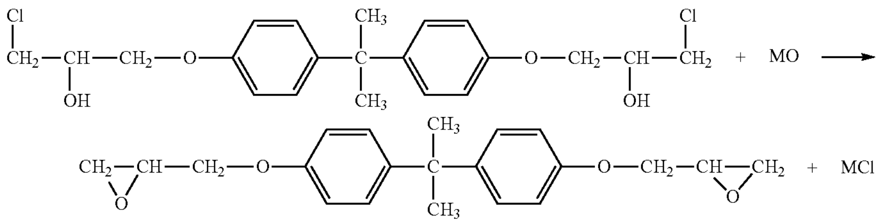

wherein MO is the metal oxide.

* * * * *